J. A. STAPLES.
VALVE MECHANISM.
APPLICATION FILED JULY 1, 1908.
949,854.
Patented Feb. 22, 1910.
3 SHEETS—SHEET 1.
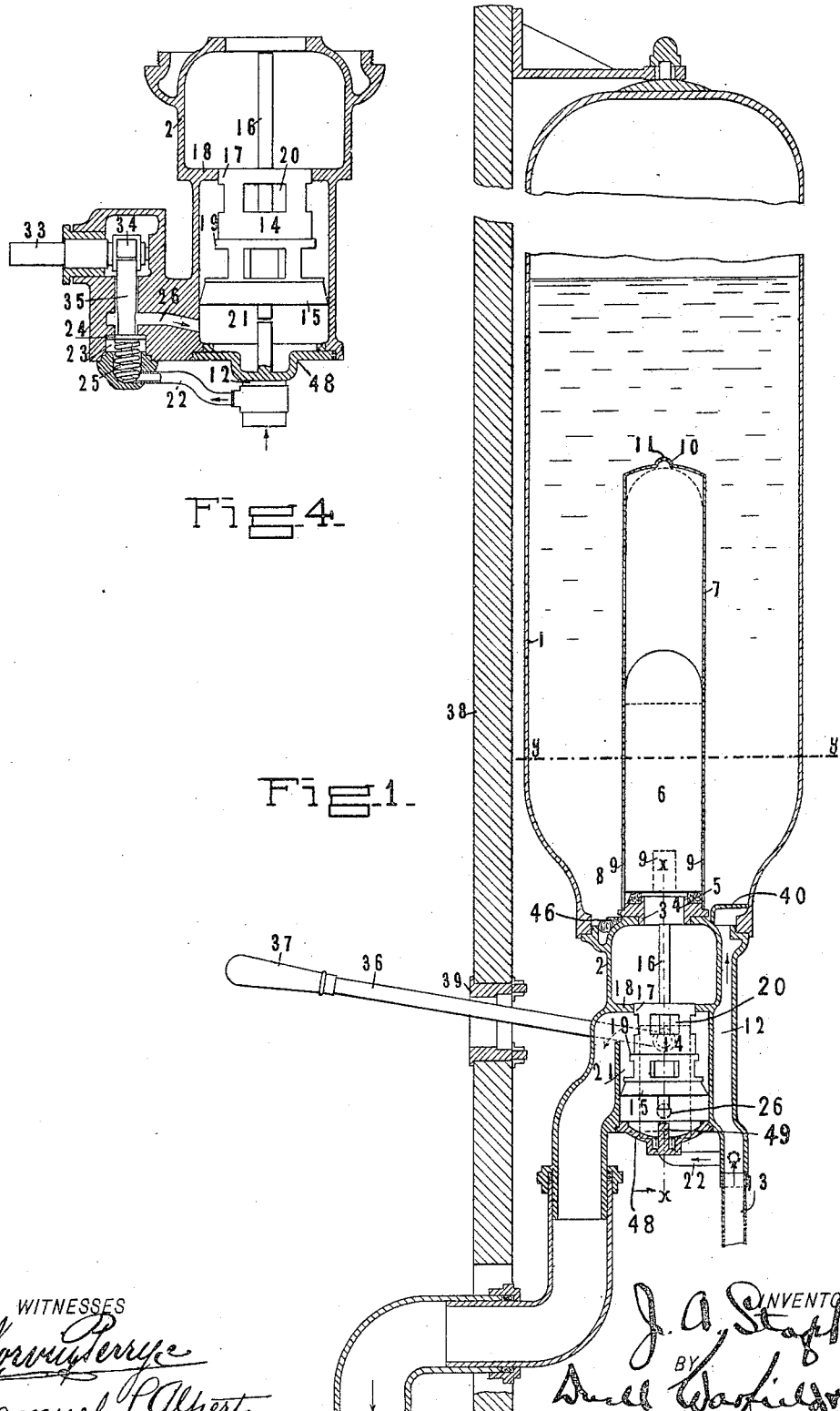

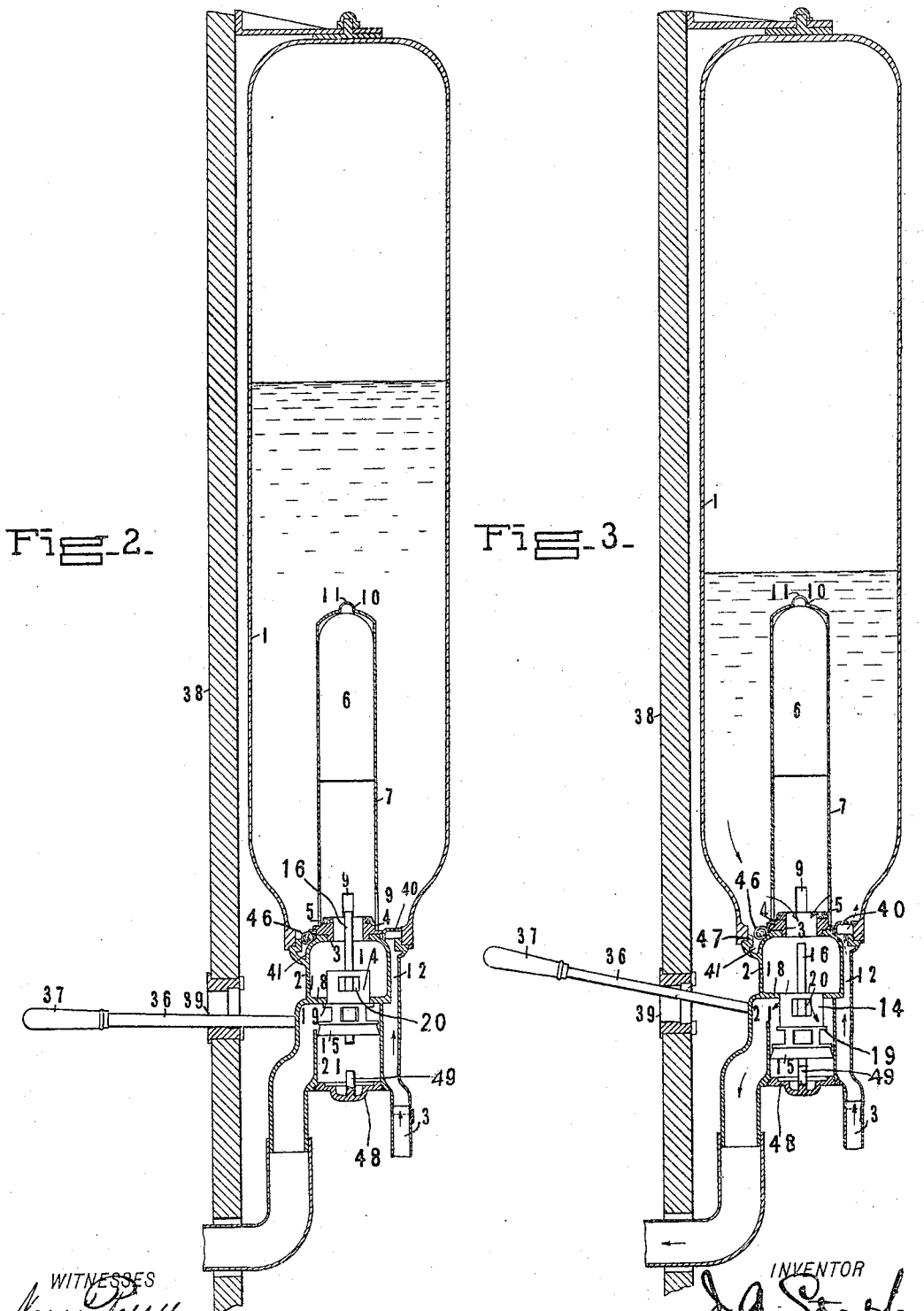

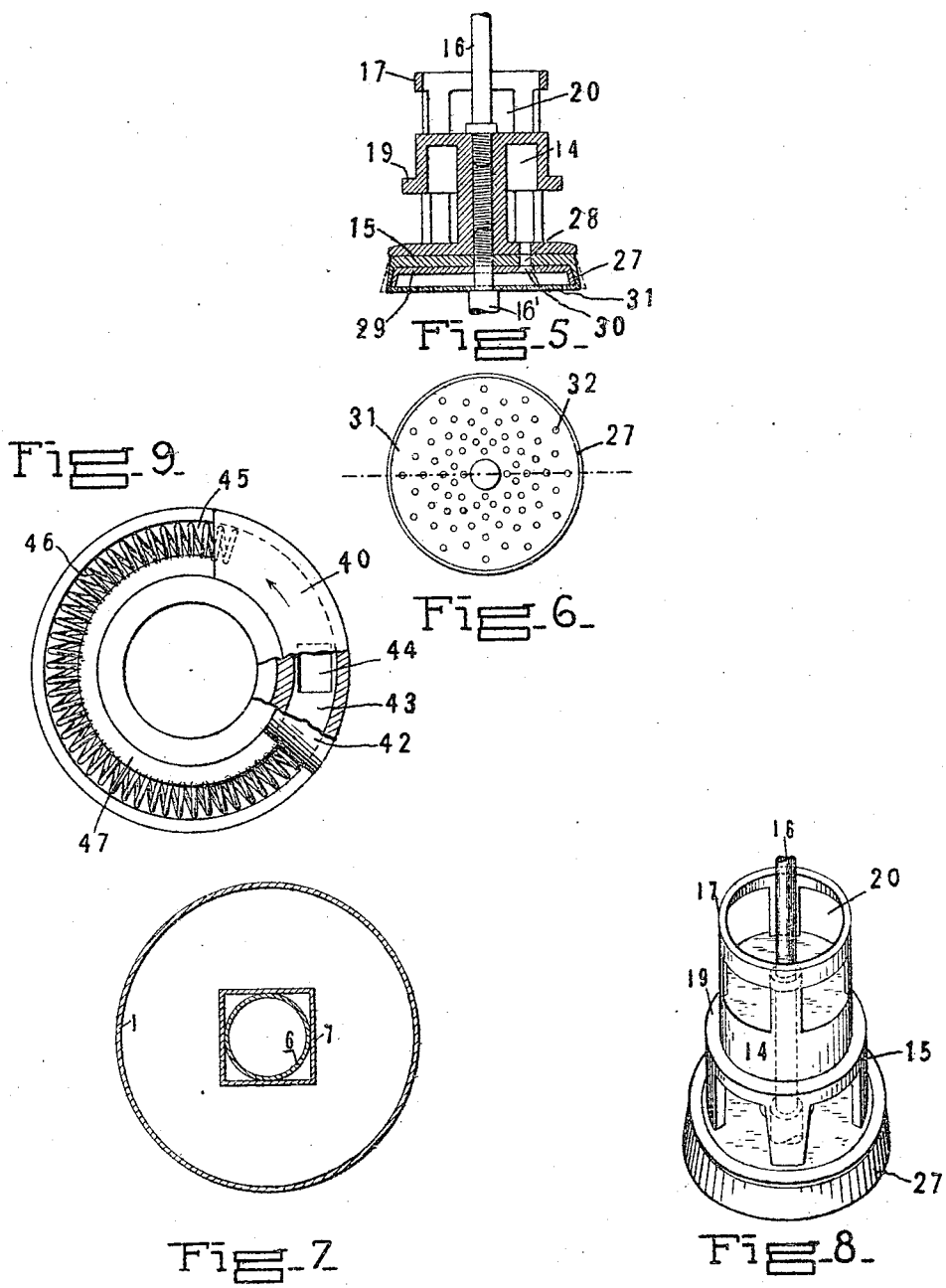

UNITED STATES PATENT OFFICE.

JOHN A. STAPLES, OF NEWBURGH, NEW YORK.

VALVE MECHANISM.

949,854.  Specification of Letters Patent.  Patented Feb. 22, 1910.

Application filed July 1, 1908. Serial No. 441,353.

*To all whom it may concern:*

Be it known that I, JOHN A. STAPLES, a citizen of the United States, residing at Newburgh, in the county of Orange and State of New York, have invented certain new and useful Improvements in Valve Mechanism, of which the following is a full, clear, and exact description, such as will enable others skilled in the art to which it appertains to make and use the same.

This invention relates to fluid control, and more specifically to apparatus for flushing closets, and the like.

One of the objects thereof is to provide efficient and practical apparatus for flushing a closet bowl.

Another object is to provide apparatus of the above type, of compact, durable, self-contained and non-complicated construction.

Another object is to provide, in connection with apparatus of the above nature, effective and easily operated actuating means.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

It may be here noted that this invention is based upon the broad principles of my invention set forth in Patent No. 774,972, granted to me November 15, 1904, and constitutes a further embodiment of means and mechanism for practicing said invention.

In the accompanying drawings, wherein is shown one of various possible embodiments of this invention, Figure 1 is a sectional elevation showing the parts in the position which they occupy before the actuating handle has been moved to unseat the valve and before the delivery connection has been opened. Fig. 2 is a sectional elevation showing the apparatus subsequent to the actuation of the operating handle, the valve being unseated but the discharge being delayed. Fig. 3 is a similar view showing the parts in the position which they occupy after the actuating handle has been released, with the water in the tank partly discharged. Fig. 4 is a sectional view taken on line $x$—$x$ of Fig. 1 on an enlarged scale. Fig. 5 is a detail sectional view of the piston shown in the other figures. Fig. 6 is an end view thereof. Fig. 7 is a view of the float or valve taken on the line $y$—$y$ of Fig. 1. Fig. 8 is a detail perspective view of the piston of Fig. 5. Fig 9 is a detail plan of baffling means.

Similar reference characters refer to similar parts throughout the several views of the drawings.

The embodiment of the present invention, as shown in the drawings, comprises broadly a tank with feed and delivery connections, a buoyant valve controlling the delivery connection, and means for feeding air into the tank and regulating the quantity of the confined air in order to control and determine the operation of the valve, as broadly set forth and shown in connection with the specific embodiment illustrated in my Patent No. 774,972, above specified.

I will first describe the general construction of the embodiment of the present invention as shown in the drawings whereupon the features of novelty and general advantages of this invention may be more efficiently pointed out and will be readily understood by one familiar with the state of the art as set forth in my original patent.

Referring first to Fig. 3 of the accompanying drawings, there is shown a receptacle or tank 1, preferably of an imperforate, cylindrical conformation, mounted upon a base connection 2. This base carries a fitting 3 either mounted thereon as shown or formed integral therewith and forming a valve seat 4 provided, if desired, with a gasket 5. The discharge opening through this valve seat is controlled by a buoyant or float valve 6 preferably of a cylindrical conformation and mounted to rise within a casing or inner chamber 7 herein shown as of square cross section. The lower end of this casing is provided with ports 9 which afford communication from the tank to the delivery when the valve 6 is off its seat. The upper end of this casing is provided with a vertically offset portion 10, having formed therein a port or vent 11. Within the walls of the base connection or fitting 2 and leading to the upper portion of said base at a point materially below the valve seat 4 is a feed connection or conduit 12 adapted to be connected to a suitable source of supply 13, as preferably ordinary service pipes supplying water under pressure from the source. Surrounding the mouth of this feed connection where it opens into the tank is a baffle plate also located below the plane of the valve seat as best shown in Fig. 9, and hereinafter described with its associated parts more in detail.

Referring now to the main valve 6, there is shown positioned beneath the same a fitting 14 directly connected with a piston 15 hereinafter described in detail. Fitting 14 is provided with a rod 16 adapted to impinge against the lower surface of valve 6, and force the same from its seat, thus permitting it to float upwardly as hereinafter described. There is formed upon this fitting, moreover, a tubular projection 17 adapted to fit within a shoulder 18 of base 2, and form a substantially fluid-tight joint therewith. Upon piston 15 being thrown to the uppermost limit of its path of travel, a shoulder 19 formed upon fitting 14 engages shoulder 18 to act as a stop. Upon the piston falling, however, there is provided a free passage, through ports 20 formed in projection 17, as indicated by the arrows to permit a free discharge from the tank 1 through the discharge pipe, the discharge passing to one side of the cylinder 21 within which piston 15 is mounted.

The piston actuating means comprise a conduit 22 leading from the conduit 12 to a valve chamber 23. The discharge is controlled by a push valve 24 normally urged as by spring 25 against its seat. From the upper side of this valve a conduit 26 leads to the cylinder 21, and it will be seen that upon the valve 24 being depressed fluid will be admitted beneath the piston 15 and force the same upwardly, as shown in Fig. 2 of the drawings.

Considering now the construction of piston 15, it is to be noted that its effective area is materially greater than the lower surface of the main valve 6. This piston comprises an outer packing or skirt 27 preferably of rubber and of a hollow or inverted cup-shaped conformation and having formed therein a relief port or ports 28. Within skirt 27 is an inverted metallic cup 29 having a port or ports 30 registering with port 28. Removably secured by means of stud 16' at the lower end of cup 29 is a perforated plate 31 having a large number of ports 32 each of which is smaller in diameter than the port 30. By the use of a piston built up as shown, there is provided a form of packing which not only efficiently seals the joint with the cylinder walls by tending to expand under any fluid pressure as indicated by dotted lines in Fig. 5, but which, by its sharp lower edge, tends as it slides back and forth to maintain in clean and smooth condition the surfaces of the parts with which it contacts.

For the actuation of the valve 24 there is preferably provided a short rock shaft 33 having thereon a dog 34 operatively related to the valve spindle 35. Fixed upon this shaft is a lever 36 provided with a handle 37 through which the shaft is rocked and the valve opened. This lever, if the tank 1 be mounted behind the wall 38, passes through a suitable guide 39 and is thus readily accessible for use.

Recurring to the means by which the incoming stream of water is baffled or broken up, there is provided at 40 a metal baffle plate which entirely covers a portion of the lower channel 41 formed in the fitting 2 adjacent its connection with the tank 1. Plate 40 is inclined downwardly as shown at 42 in Fig. 9 to form a closed pocket 43 at one side of the inlet port 44, but is open as at 45 to permit the incoming stream to enter the tank. Mounted upon the upper portion of the fitting 2 is a coil spring 46 held in position by an annular flange 47 and resting preferably with its end beneath the plate 40 and so fitted as to receive substantially the entire incoming stream.

The operation of the above described embodiment of this invention is substantially as follows: Assuming the parts to be in normal condition, the tank 1 being in communication with the source of supply is filled with water as to the level indicated in Fig. 1, having in its upper portion a quantity of air, sufficient under all conditions to actuate the mechanism as hereinafter described. This air being exposed to the full pressure from the source of supply is correspondingly reduced in volume, and is adapted upon being released to expand in such manner as to fill the entire casing down to the level of the valve seat under all conditions without being reduced beneath atmospheric pressure. The float valve 6 is under these conditions against its seat, being held firmly in this position by the excess of downward fluid pressure thereon due to the fact that its portions resting upon the valve seat and opposite the discharge opening are exposed to atmospheric pressure only while upon its remaining portions is brought to bear the full pressure of the fluid supply, thus resulting in a heavy downward resultant pressure.

When it is desired to actuate the mechanism the lever 36 is swung as above described to open valve 24, thus admitting water beneath the piston 15 and quickly forcing the same to its uppermost position by reason of the preponderance of area of this piston over that of the portion of the valve 6 shielded from the pressure within the tank 1. The upward movement of rod 16 forces the float valve 6 slightly from its seat, permitting the water from the tank to flow downwardly as far as the shoulder 19, and equalizing the pressure of the fluid to which the float is exposed upon its upper and lower sides. Float valve 6 thereupon immediately moves upwardly in the casing 7, as to the position shown in Fig. 2 of the drawings, the offset portion 10 protecting the port 11 from any battering or deformation thereof by the float, or tendency of the latter to seal this opening or clog it by carrying foreign matter thereto. In this manner this vent, the effective size of which is highly important, is maintained in clean and undeformed condition. The entire column of water within the tank now rests upon the shoulder 18, the air which was trapped between the valve seat and this part passing upwardly to feed that contained in the upper portion of the tank. The parts remain in this condition as long as the valve 24 is held open, by reason of the fact that the supply beneath the piston 15 is considerably greater than can be discharged through the ports formed therein. Upon the valve 24 being permitted to close, however, the fluid beneath piston 15 escapes through the discharge ports formed therein, and permits this part, as well as the rod 16, to fall into their lowermost positions.

By reason of the positioning of the discharge ports 20 in the upper portion of the tubular projection 17, the piston must fall throughout a material portion of its travel before the discharge begins. In this manner the discharge is delayed even though the valve 24 is quickly permitted to close after actuation, as the downward movement of the piston can take place only at such rate as is desired governed by the size of the escape port in the piston, and this downward movement must be of such extent as to bring the ports 20 beneath the flange 18. Thus the air trapped within the fitting 2 above the flange 18 is given ample time to rise into the upper portion of the tank 1, no matter how carelessly or hastily the handle 31 may be depressed and released. There is provided thus a fluid discharge passage for the fluid within tank 1, and the same passes as indicated by the arrows through the discharge conduit. The discharge is terminated by the seating of the float valve 6, the action of this part in this respect being the same as that of the corresponding element of the construction of my patent above referred to. The valve 6 reaches its closed position in this manner slightly before the level in the main tank has reached that of the valve seat, and thus maintains a water seal over the discharge port. If, however, there is an excessive pressure of air within the tank, the same is blown out just prior to the seating of the valve. The discharge is thus cut off, and the tank is again filled from the feed conduit 12, the incoming jet being directed within the spring 46, and given a whirling movement by the spiral surfaces it engages, as it passes about the base of the tank. By this action, as well as the deflecting effect of the plate 40 and the muffling effect of the body of water remaining in the base beneath the level of the valve seat 4, the incoming jet, even though of high pressure, is broken up and substantially dissipated as it rises within the tank. If the water fed to the tank is of extremely high pressure, a slight rotary movement is imparted to the fluid about the valve seat, thus producing a slight vortex effect tending to aid in seating the valve and thus neutralizing any effect of an upward current on the lower surface of the valve, which might otherwise have a tendency to interfere with the proper downward movement of this part. It may be noted, moreover, that the pocket 43 aids in breaking up the violent stream of feed water by tending to produce an eddy or whirling action at this point instead of directing the full force of the stream against the spring 46. Upon the water rising until the air in the upper portion of the tank is at the pressure of the source of supply, the apparatus is then again in normal charged condition, and the bowl may be again flushed by a repetition of the above cycle of operations.

By reason of the conformation of the piston 15 as shown, no sediment or other foreign matter which may be in the water can reach the port 30 without passing through the smaller ports 32, and thus being of such size as readily to escape through the former. The ports 32, moreover, are of such number that it is immaterial if one or if many of them become clogged in use, and if desired the entire piston may be removed at any time and taken apart, thus permitting the cleaning of this plate as well as the interior of the piston. The removal of these parts without cutting off the supply to the main tank is brought about by providing a removable head 48 upon the cylinder 21, this part having formed thereon an abutment 49 providing a surface extending above any sediment which may accummulate in the cylinder and acting as a stop to limit the downward movement of the piston. It is to be noted, moreover, that by the arrangement of the cylinder 21 and the discharge and inlet conduits in a single casting, in which this head 48 is detachably secured, the apparatus is not only simplified and cheapened but the strength as a whole is increased, and the number of joints, with resultant tendency to leakage, is materially reduced. Moreover, by reason of this construction with the tank mounted thereon as shown, it is possible to draw all of the water from the bottom of the tank as for purposes of shipping after test, or in the event that the apparatus is to be exposed to a freezing temperature after having been installed for use. The latter advantages are due largely to the disposition of the inlet port at the bottom of the tank, and from this construction there also results not only the provision of a body of water to baffle the incoming stream and seal the joint between the main valve and its seat, but such a conformation as will materially increase the amount of air compressed upon initially admitting water to the tank.

By reason of the formation of the float 6 as shown and described, it is of a simple and inexpensive construction, and is unlikely to become deformed in use in such manner as to cause any tendency to bind with respect to the casing 7. The latter part, moveover, being of square cross section readily permits the passage of fluid between it and the valve and the conformation of the portion 10 is such as to do away with any tendency of the same to become battered by reason of contact with the float as above noted.

The use of hydraulic mechanism for starting the float from its seat provides means whereby this part may be moved with certainty throughout the short distance required without effort on the part of the user. It is unnecessary with this apparatus to move the valve throughout any considerable distance, as is the case with many forms of apparatus now in general use, but the resistance to this short movement may be considerable. It will thus be seen that hydraulic mechanism is peculiarly adapted to apply power in the most efficient manner to bring about this precise character of movement. It may be noted, moreover, that by means of mechanism shown, the power is applied directly to the valve without lateral component, and there is thus no tendency to rock the valve or cause it to bind with respect to its guiding means.

It will thus be seen that there is provided apparatus in which the several objects of this invention are achieved, and the above described advantages are, among others, present. The entire construction is simple, compact and durable, and its action is reliable and practical to a high degree.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention what I claim as new and desire to secure by Letters Patent is:

1. In a device of the class described, in combination, a tank, feed and delivery connections therefor, a valve adapted to establish communication between said tank and said delivery connection, hydraulic means for opening said valve, means for closing said valve by the pressure of air within the tank, and means for regulating the quantity of air within the tank.

2. In a device of the class described, in combination, a tank, feed and delivery connections therefor, a valve adapted to establish communication between said tank and said delivery connection, means for exposing said valve to pressure from the feed connection to open the same, means for closing said valve by the pressure of air within the tank, and means for regulating the quantity of air within the tank.

3. In a device of the class described, in combination, a tank, feed and delivery connections therefor, a float valve adapted to establish communication between said tank and said delivery connection, means for exposing said valve to pressure from the feed connection to open the same, means for closing said valve by the pressure of air within the tank, and means for adding to the quantity of air within the tank.

4. In a device of the class described, in combination, a closed tank, a feed connection therefor adapted to supply water under pressure from a source of supply, a delivery connection for said tank, a valve adapted to control communication between said tank and said delivery connection, a piston controlling the opening of said valve, and means for operating said piston by pressure from the source of supply.

5. In a device of the class described, in combination, a closed tank, a feed connection therefor adapted to supply water under pressure from a source of supply, a delivery connection for said tank, a valve adapted to control communication between said tank and said delivery connection, a piston controlling the opening of said valve, means for operating said piston by pressure from the source of supply, and means for controlling the application of said pressure to said piston.

6. In a device of the class described, in combination, a closed tank, a feed connection therefor adapted to supply water under pressure from a source of supply, a delivery connection for said tank, a valve adapted to control communication between said tank and said delivery connection, a piston controlling the opening of said valve, means for operating said piston by pressure from the source of supply, and manual means for controlling the application of said pressure to said piston.

7. In a device of the class described, in combination, a closed tank, a feed connection therefor adapted to supply water under pressure from a source of supply, a delivery connection for said tank, a valve adapted to control communication between said tank and said delivery connection, a piston controlling the opening of said valve, means for exposing said piston to pressure from the source of supply to actuate the same, and means for retarding the release of said pressure to which said piston is exposed.

8. In a device of the class described, in combination, a tank, a feed connection therefor adapted to supply water under pressure, a delivery connection, a valve mounted to control communication between said tank and delivery connection, and means to expose said valve to pressure from the feed connection to open the same.

9. In a device of the class described, in combination, a tank, a feed connection therefor adapted to supply water under pressure, a delivery connection, a valve mounted to control communication between said tank and said delivery connection, and means for establishing communication between said feed and the delivery side of said valve whereby the valve may be opened under pressure from the source of supply.

10. In a device of the class described, in combination, a tank, a feed connection therefor adapted to supply water under pressure, a delivery connection, a valve tank, a buoyant valve for controlling communication between said tank and said delivery connection, means for closing said valve by pressure of air within said tank, a piston operative to control the unseating of said valve, means operating said piston under pressure from the source of supply, manual means for controlling the application of said pressure to said piston, and means for regulating the release of said piston from said pressure.

11. In a device of the class described, in combination, a tank, a feed connection therefor adapted to supply water under pressure, a delivery connection with said tank, a valve for controlling communication between said tank and said delivery connection, a piston operative to control the unseating of said valve, means for operating said piston under pressure from the source of supply, and means for controlling the application of said pressure to said piston.

12. In a device of the class described, in combination, a tank, a feed connection therefor adapted to supply water under pressure, a delivery connection for said tank, a buoyant valve mounted to control communication between said tank and said delivery connection, a piston operative to control the unseating of said valve, a connection from said feed connection to said piston, whereby said piston may be operated by pressure from the source of supply, means interposed in said connection and adapted to close the same, said means being normally held closed by pressure from the supply, and manual means for opening said connection to operate said piston.

13. In a device of the class described, in combination, a tank, a feed connection therefor adapted to supply water under pressure, a delivery connection for said tank, a buoyant valve mounted to control communication between said tank and said delivery connection, a piston operative to control the unseating of said valve, a connection from said feed connection to said piston, whereby said piston may be operated by pressure from the source of supply, means interposed in said connection and adapted to close the same, said means being normally held closed by pressure from the supply, and means for opening said connection to operate said piston.

14. In a device of the class described, in combination, a tank, a feed connection therefor adapted to supply water under pressure, a delivery connection, a valve controlling communication between said tank and said delivery connection, means for opening said valve, means for operating said opening means by pressure from the source of supply, a valve controlling the application of said supply pressure to said opening means, said valve being normally held closed by said supply pressure, and manual means for opening said valve.

15. In a device of the class described, in combination, a tank, a feed connection therefor adapted to supply water under pressure, a delivery connection, a valve controlling communication between said tank and said delivery connection, means for opening said valve, means for operating said opening means by pressure from the source of supply, a valve controlling the application of said supply pressure to said opening means, said valve being normally held closed by said supply pressure, and means for opening said valve.

16. In a device of the class described, in combination, a tank, a feed connection therefor adapted to supply water under pressure, a delivery connection for said tank, a valve controlling communication between said tank and said delivery connection, a movable member adapted in one position thereof to control the opening of said valve, a connection adapted to expose said movable member to pressure from the source to operate the same, means controlled by the supply pressure whereby said connection is normally held closed, and means for opening said connection to actuate said movable member.

17. In a device of the class described, in combination, a tank, a feed connection therefor adapted to supply water under pressure, a delivery connection for said tank, a valve controlling communication between said tank and said delivery connection, a piston so mounted as at one point in its movement to effect the unseating of said valve, a cylinder within which said piston operates, a connection from said feed to said cylinder to operate said piston in one direction under pressure from the source, means for opening and closing said connection to control the application of said pressure, and means for regulating the release of said piston from said pressure.

18. In a device of the class described, in combination, a tank, a feed connection therefor adapted to supply water under pressure, a delivery connection to said tank, a valve controlling communication between said tank and said delivery connection, a cylinder, a piston mounted for movement in said cylinder and adapted in one position to effect the unseating of said valve, a connection from said feed to said cylinder whereby said piston can be moved to effect the unseating of said valve under pressure from the supply, means for controlling said connection to control the application of said pressure to said piston, and a plurality of discharge ports adapted to permit the escape of the water from said cylinder for relieving said piston from said pressure.

19. In a device of the class described, in combination, a tank, a feed connection therefor adapted to supply water under pressure, a delivery connection to said tank, a valve controlling communication between said tank and said delivery connection, a cylinder, a piston mounted for movement in said cylinder and adapted in one position to effect the unseating of said valve, a connection from said feet to said cylinder whereby said piston can be moved to effect the unseating of said valve under pressure from the supply, and means for controlling said connection to control the application of said pressure to said piston.

20. In a device of the class described, in combination, a tank, a feed connection therefor adapted to supply water under pressure, a delivery connection to said tank, a valve controlling communication between said tank and said delivery connection, a cylinder, a piston mounted for movement in said cylinder and adapted in one position to effect the unseating of said valve, a connection from said feed to said cylinder whereby said piston can be moved to effect the unseating of said valve under pressure from the supply, means for controlling said connection to control the application of said pressure to said piston, and a discharge port for said cylinder for relieving said piston from said pressure, said discharge port communicating with a discharge passage of greater area than said first port.

21. In a device of the class described, in combination, a tank, a feed connection therefor adapted to supply water under pressure, a delivery connection to said tank, a valve controlling communication between said tank and said delivery connection, a cylinder, a piston mounted for movement in said cylinder and adapted in one position to effect the unseating of said valve, a connection from said feed to said cylinder whereby said piston can be moved to effect the unseating of said valve under pressure from the supply, means for controlling said connection to control the application of said pressure to said piston, and a discharge port for said cylinder for relieving said piston from said pressure.

22. In a device of the class described, in combination, a tank, a feed connection therefor, adapted to supply water under pressure, a delivery connection to said tank, a valve controlling communication between said tank and said delivery connection, a cylinder, a piston mounted for movement in said cylinder and adapted in one position to effect the unseating of said valve, a connection from said feed to said cylinder whereby said piston can be moved to effect the unseating of said valve under pressure from the supply, means for controlling said connection to control the application of said pressure to said piston, and a plurality of discharge ports for relieving said piston from said pressure, said discharge ports communicating with a discharge port of greater area than any of said first ports.

23. In a device of the class described, in combination, a tank, a feed connection therefor, a delivery connection to said tank, a valve controlling communication between said tank and said delivery connection, a cylinder, a piston mounted in said cylinder and adapted to effect the unseating of said valve, and a removable head for said cylinder.

24. In a device of the class described, in combination, a tank, a delivery connection therefor, a valve adapted to control communication between said tank and said delivery mechanism, a piston, a cylinder mounted in said piston and adapted to effect the unseating of said valve, means for exposing said piston to hydraulic pressure to move the same and unseat the valve, a chamber within said piston, a port establishing communication between said chamber and the pressure face of said piston, and a port establishing communication from said chamber to the atmosphere.

25. In a device of the class described, in combination, a tank, a delivery connection, a valve adapted to control communication between said tank and said delivery connection, a piston, a cylinder mounted in said piston and adapted to effect the unseating of said valve, means for exposing said piston to hydraulic pressure to move the same to unseat the valve, a chamber within said piston, a plurality of ports establishing communication between said chamber and the pressure face of said piston, and a port establishing communication from said chamber to the atmosphere.

26. In a device of the class described, in combination, a tank, a delivery connection therefor, a valve controlling communication between said tank and said delivery connection, a cylinder, a piston mounted for movement to effect the unseating of said valve, means for exposing one face of said piston to hydraulic pressure to move the same in one direction, a vent chamber formed in said piston, a plurality of ports between said vent chamber and the pressure face of said piston, and a discharge vent opening from said chamber.

27. In a device of the class described, in combination, a tank, a delivery connection therefor, a valve controlling communication between said tank and said delivery connection, a piston operable to effect the unseating of said valve, means for operating said piston in its unseating movement by hydraulic pressure, means for operating said piston in its reverse direction, and means controlling the release of said hydraulic pressure to regulate the reverse movement of said piston.

28. In a device of the class described, in combination, a tank, a fitting adapted for connection with said tank, said fitting containing a feed connection, an intermediate air chamber, a delivery connection, and an operating chamber, said operating chamber being provided with a removable head.

29. In a device of the class described, in combination, a tank, a delivery connection therefor, a valve adapted to control communication between said tank and said delivery connection, means for confining a body of air within said tank, means for closing said valve by the pressure of said air, means for regulating the quantity of air so confined, and a feed connection adapted to supply water under pressure to said tank, said feed connection opening into said tank at a point below the valve seat.

30. In a device of the class described, in combination, a tank, a delivery connection therefor, a valve adapted to control communication between said tank and said delivery connection, means for confining a body of air within said tank, means for closing said valve by the pressure of said air, means for regulating the quantity of air so confined, and a feed connection adapted to supply water under pressure to said tank, said feed connection opening into said tank at the lowest point thereof whereby all the water from said tank can be drained through said feed connection.

31. In a device of the class described, in combination, a tank, feed and delivery connections therefor, a valve controlling said delivery connection, a piston operable to unseat said valve, said piston comprising a main disk member, a flexible contact member carried by said disk, a metallic cup member within said flexible member, a perforated plate closing said inner cup member, a stud projecting in a downward direction away from said disk, a plunger carried by said disk on the opposite side from said cup member, said plunger having an outwardly extending flanged contacting shoulder, and a ring carried above said plunger by spaced supports, whereby water passages are formed between said supports.

32. In a device of the class described, in combination, a tank, a delivery connection for said tank, a valve seat for said delivery connection, a buoyant valve adapted to rest upon said seat to control communication between said tank and said delivery connection, a feed connection opening within said tank below the plane of said valve seat, a baffle surrounding said feed opening below the plane of said valve seat, means for feeding air into said tank, and means for regulating the quantity of air within said tank.

33. In a device of the class described, in combination, a tank, a fitting carrying a delivery connection for said tank, a valve seat for said delivery connection, said valve seat projecting within the tank, a float valve adapted to control communication between said tank and said delivery connection and mounted upon said valve seat, and a feed connection opening into said tank below the plane of said valve seat.

34. In a device of the class described, in combination, a tank, a delivery connection therefor, a valve controlling communication between said tank and said delivery connection, a supplemental chamber formed in said delivery connection, a valve seat, and a fluid controlled piston adapted to effect the unseating of said valve and to close said delivery connection below said supplemental chamber, said piston being so formed that the delivery connection is first closed, the valve thereupon unseated, the supplemental chamber held for a period in communication with the tank but not with the delivery connection, and the delivery connection thereafter opened through the supplemental chamber.

35. In a device of the class described, in combination, a tank, a delivery connection therefor, a valve controlling communication between said tank and said delivery connection, a supplemental chamber formed in said delivery connection on the delivery side of the valve seat, and a fluid controlled piston operable in said delivery connection and through said supplemental chamber to first close the opening from said supplemental chamber to said delivery connection, thereafter open the delivery valve, then hold said supplemental chamber closed from said delivery connection while it is opened to said tank, and finally open said supplemental chamber to said delivery connection.

36. In a device of the class described, a fitting comprising a delivery connection, a main operating chamber, a supplemental air chamber, a supplemental operating chamber, and a communication from said supplemental operating chamber to said main operating chamber.

37. In a device of the class described, in combination, a supplemental chamber, a cylinder, and an operating piston having an upper stud, a lower stud, a piston head, a closing flange, an imperforate portion and delivery ports, whereby communication from said supplemental chamber may be controlled and timed.

38. In mechanism of the class described, in combination, a closed receptacle having a discharge opening in the lower portion thereof, a feed conduit leading to said receptacle at a point lower than the level of said discharge opening, and a float valve adapted automatically upon the contents of said receptacle passing out through said discharge opening to close the same and permit water to flow into said receptacle through said feed conduit.

39. In mechanism of the class described, in combination, a receptacle provided with a discharge opening, a float controlling said discharge opening, and means forming a chamber into which said float is adapted to rise, a portion of said means being formed to be free from contact with said float in all positions thereof and having formed therein an air port leading within said means.

40. In mechanism of the class described, in combination, a receptacle provided with a discharge opening, a float controlling said discharge opening, and means forming a guide within which said float is adapted to rise and shaped to limit the upward movement thereof and having a portion above the upper limit of the path of travel of said float in which is formed an air port.

41. In mechanism of the class described, in combination, a receptacle provided with a discharge opening, a round float controlling said discharge opening, an angular member within which said float is adapted to rise and provided with a portion formed to be free from contact with said float in all positions thereof and having an air port formed in said portion, and means adapted to admit fluid to said member beneath said float.

42. In mechanism of the class described, in combination, a receptacle provided with a discharge opening, a cylindrical float controlling said discharge opening, an angular casing within which said float is adapted to rise and by which it is guided in its upward movement, said casing being provided with a portion formed to be free from contact with said float in all positions thereof, and having an air port formed in said portion, and means adapted to admit fluid to said casing beneath said float.

43. In mechanism of the class described, in combination, a closed receptacle having a discharge opening and a valve seat about the same, a float valve normally held against said seat by downward fluid pressure thereon, and hydraulically actuated means adapted to start said valve from its seat and permit the same to float upwardly.

44. In mechanism of the class described, in combination, a closed receptacle having a discharge opening and a valve seat about the same, a float valve normally held against said seat by downward fluid pressure thereon, hydraulically actuated means adapted to start said valve from its seat and permit the same to float upwardly, and a common source of fluid supply connected with said receptacle and with said hydraulic means.

45. In mechanism of the class described, in combination, a closed receptacle having a discharge opening and a valve seat about the same, a float valve normally held against said seat by downward fluid pressure thereon, a piston positioned beneath said seat and mounted to move toward and away from the same whereby power is applied directly to and in the direction of movement of said valve, and means adapted to admit fluid beneath said piston and cause the same to raise said valve.

46. In mechanism of the class described, in combination, a closed receptacle having a discharge opening and a valve seat about the same, a float valve normally held against said seat by downward fluid pressure thereon, a piston positioned beneath said seat and mounted to move toward and away from the same whereby power is applied directly to and in the direction of movement of said valve, means adapted to admit fluid beneath said piston and cause the same to raise said valve, and a common source of fluid supply connected with said receptacle and said fluid-admitting means.

47. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston being provided with a pair of ports serially connected one with another and spaced one from another through which said fluid is permitted to escape.

48. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston being provided with a multiplicity of ports through which said fluid is permitted to escape, whereby one or more of said ports may become clogged without preventing the escape of said fluid.

49. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston comprising a plate having a multiplicity of perforations therethrough through which said fluid is permitted to escape.

50. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston being provided with a pair of ports serially connected one with another through which said fluid is permitted to escape.

51. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston being provided with a pair of ports serially connected one with another through which said fluid is permitted to escape and said ports being of successively larger diameters in the direction of flow of said fluid.

52. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston being provided upon one side with a plurality of ports and upon the other side with a port connected with said first ports through which said fluid is permitted to escape.

53. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston being provided upon one side with a plurality of ports and upon the other side with a port of larger diameter than said first ports and connected therewith through which said fluid is permitted to escape.

54. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston comprising a removable portion having a port formed therein and having formed in itself another port connected with said first port through which said fluid is permitted to escape.

55. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston being provided with a removable portion having a port formed therein and having formed in itself another port of a different diameter through which said fluid is permitted to escape.

56. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston comprising a removable portion provided with a plurality of ports and having formed therein a port communicating with said first mentioned ports through which said fluid is permitted to escape.

57. In mechanism of the class described, in combination, a closed receptacle having a discharge opening and a valve seat about the same, a valve coacting with said seat, a piston operatively related to said valve and adapted to force the same from said seat, and means adapted to lead a fluid to said piston to actuate the same, said piston being of an inverted cup shaped conformation and having secured to its lower portion a member provided with a plurality of ports and having formed therein a port of larger diameter than said first ports.

58. In mechanism of the class described, in combination, a receptacle having a discharge opening and a valve seat about the same, a valve normally held against said seat, a piston beneath said seat, means connected with said piston adapted upon the same moving upwardly to force said valve from its seat, and a one-piece fitting mounted beneath said receptacle and comprising a cylinder within which said piston is mounted and a feed conduit leading to said receptacle.

59. In mechanism of the class described, in combination, a receptacle having a discharge opening and a valve seat about the same, a valve normally held against said seat, a piston beneath said seat, means connected with said piston adapted upon the same moving upwardly to force said valve from its seat, and a one-piece fitting mounted beneath said receptacle and comprising a cylinder within which said piston is mounted and a discharge conduit leading from said receptacle.

60. In mechanism of the class described, in combination, a receptacle having a discharge opening and a valve seat about the same, a valve normally held against said seat, a piston beneath said seat, means connected with said piston adapted upon the same moving upwardly to force said valve from its seat, and a one-piece fitting mounted beneath said receptacle and comprising a cylinder within which said piston is mounted, a feed conduit leading to said receptacle, and a discharge conduit leading therefrom.

61. In mechanism of the class described, in combination, a receptacle having a discharge opening and a valve seat about the same, a valve normally held against said seat, a piston beneath said seat, means connected with said piston adapted upon the same moving upwardly to force said valve from its seat, a one-piece fitting mounted beneath said receptacle and comprising a cylinder within which said piston is mounted, a feed conduit leading to said receptacle, and a discharge conduit leading therefrom, and a head detachably secured to said fitting opposite said cylinder, whereby said piston may be removed.

62. In mechanism of the class described, in combination, a receptacle having a discharge opening and a valve seat about the same, a valve normally held against said seat, a piston beneath said seat, means connected with said piston adapted upon the same moving upwardly to force said valve from its seat, and a one-piece fitting mounted beneath said receptacle and comprising a cylinder within which said piston is mounted and a valve chamber having communication therewith.

63. In mechanism of the class described, in combination, a receptacle having a discharge opening and a valve seat about the same, a valve normally held against said seat, a piston beneath said seat, means connected with said piston adapted upon the same moving upwardly to force said valve from its seat, and a one-piece fitting mounted beneath said receptacle and comprising a cylinder within which said piston is mounted, a valve chamber communicating therewith, a feed conduit leading to said receptacle, and a discharge conduit leading therefrom.

64. In mechanism of the class described, in combination, a closed receptacle having a discharge opening and a valve seat about the same, a float valve normally held against said seat by downward fluid pressure thereon, means comprising a chamber positioned beneath said valve and provided with a discharge opening, means adapted upon being moved to close the discharge opening from said chamber and force said valve from its seat, and means adapted to retard the return of said last means to its original position whereby the air trapped within said chamber is permitted to rise within said receptacle.

65. In mechanism of the class described, in combination, a closed receptacle having a discharge opening and a valve seat about the same, a float valve normally held against said seat by downward fluid pressure thereon, means comprising a chamber positioned beneath said valve and provided with a discharge opening, and a fitting adapted upon being raised to first close the discharge opening of said chamber and then upon further movement to force said valve from its seat, whereby upon said fitting being permitted to return the discharge from said chamber is delayed and the air trapped therein permitted to rise in said receptacle.

66. In mechanism of the class described, in combination, a closed receptacle having a discharge opening and a valve seat about the same, a float valve normally held against said seat by downward fluid pressure thereon, means comprising a chamber positioned beneath said valve and provided with a discharge opening, a fitting adapted upon being raised to first close the discharge opening of said chamber and then upon further movement to force said valve from its seat, whereby upon said fitting being permitted to return the discharge from said chamber is delayed and the air trapped therein permitted to rise in said receptacle, and means adapted to retard the downward movement of said fitting.

67. In apparatus of the class described, in combination, a tank, a source of water supply, means leading from said source of supply to said tank, and means adapted to whirl said water about a curved axis as it enters the tank.

68. In apparatus of the class described, in combination, a tank, a source of water supply, means adapted to lead water from said source of supply into said tank in a lateral direction, and means adapted to break up the entering stream.

69. In apparatus of the class described, in combination, a tank, a source of water supply, means adapted to lead water from said source of supply to said tank and throw the same in a curved path as it enters the tank, and means interposed in said path adapted to break up the entering stream.

70. In apparatus of the class described, in combination, a tank, a source of water supply, means adapted to lead water from said source of supply to said tank and throw the same in a curved path as it enters the tank, and means interposed in said path adapted to break up the entering stream, said last mentioned means having portions inclined with respect to the direction of flow of the water.

71. In apparatus of the class described, in combination, a tank, a source of water supply, means adapted to lead water from said source of supply into said tank, and means interposed in the path of the incoming water adapted to break up the entering stream, said last means having portions inclined with respect to the direction of flow of the water.

72. In apparatus of the class described, in combination, a tank, a source of water supply, means adapted to lead water from said source of supply to said tank, and resilient means interposed in the path of the water and adapted to break up the entering stream.

73. In apparatus of the class described, in combination, a tank, a source of water supply, means adapted to lead water from said source of supply to said tank, and a spiral spring interposed in the path of the water and adapted to break up the entering stream.

74. In apparatus of the class described, in combination, a tank, a source of water supply, means adapted to lead water from said source of supply to said tank and throw the same in a curved path as it enters the tank, and a spiral spring interposed within said path and adapted to receive within itself the entering stream.

75. In apparatus of the class described, in combination, a tank, a source of water supply, means adapted to lead water from said source of supply to said tank, deflecting means adapted to throw said water in a horizontal direction as it enters the tank, and means adapted to break up all upward components of the entering stream.

76. In apparatus of the class described, in combination, a tank, a source of water supply, means adapted to lead water from said source of supply to said tank, and means adapted to throw substantially the entire entering stream in a single horizontal direction as it enters the tank.

77. In apparatus of the class described, in combination, a tank, a source of water supply, means adapted to lead water from said source of supply to said tank, and means adapted to throw substantially the entire entering stream in a single horizontal direction as it enters the tank, said last means comprising a deflecting plate extending over the point of entry of the water and forming a closed pocket at one side thereof.

78. In apparatus of the class described, in combination, a tank, a source of water supply, means adapted to lead water from said source of supply to said tank, said tank being formed to provide a channel in the lower portion thereof into which the water is led, and a deflecting plate over a portion of said channel and formed to provide a closed pocket at one side of the entering stream and guide the same in the opposite direction.

79. In apparatus of the class described, in combination, a tank, a source of water supply, means leading from said source of supply to said tank, means adapted to whirl said water about a curved axis as it enters the tank, said tank being provided with a discharge port about which the entering stream is led and being closed to admit of air being compressed therein, and a valve coacting with said port to close the same and mounted to move upwardly away therefrom.

80. In apparatus of the class described, in combination, a tank, a source of water supply, means adapted to lead water from said source of supply to said tank, and throw the same in a curved path as it enters the tank, means interposed in said path adapted to break up the entering stream, said tank being provided with a discharge port about which the entering stream is led and being closed to admit of air being compressed therein, and a valve coacting with said port to close the same and mounted to move upwardly away therefrom.

81. In apparatus of the class described, in combination, a tank, a source of water supply, means adapted to lead water from said source of supply to said tank and throw the same in a curved path as it enters the tank, means interposed in said path adapted to break up the entering stream, said last mentioned means having portions inclined with respect to the direction of flow of the water, said tank being provided with a discharge port about which the entering stream is led and being closed to admit of air being compressed therein, and a valve coacting with said port to close the same and mounted to move upwardly away therefrom.

82. In apparatus of the class described, in combination, a tank, a source of water supply, means adapted to lead water from said source of supply to said tank, a spiral spring interposed in the path of the water and adapted to break up the entering stream, said tank being formed to provide a discharge port and being closed to admit of air being compressed therein, means adapted to hold said spiral spring in a position curved about the lower portion of the tank beneath said port, and a valve coacting with said port to close the same and adapted to move upwardly away therefrom.

83. In apparatus of the class described, in combination, a tank, a source of water supply, means adapted to lead water from said source of supply to said tank, means adapted to break up the upward components of the stream as it enters the tank, said tank being provided with a discharge port adjacent the point of entry of said water and being closed to admit of air being compressed therein, and a valve coacting with said port to close the same and adapted to move upwardly away therefrom.

84. In apparatus of the class described, in combination, a tank, a source of water supply, means leading from said source of supply to said tank, and means adapted to whirl said water about a curved axis as it enters the tank, said tank being formed to provide a discharge port above said whirling means.

85. In apparatus of the class described, in combination, a tank, a source of water supply, means adapted to lead water from said source of supply to said tank and throw the same in a curved path as it enters the tank, and means interposed in said path adapted to break up the entering stream, said tank being formed to provide a discharge port above said last mentioned means.

86. In apparatus of the class described, in combination, a tank, a source of water supply, means adapted to lead water from said source of supply to said tank and throw the same in a curved path as it enters the tank, and means interposed in said path adapted to break up the entering stream, said last mentioned means having portions inclined with respect to the direction of flow of the water and said tank being formed to provide a discharge port above said last mentioned means.

87. In apparatus of the class described, in combination, a tank, a source of water supply, means leading from said source of supply to said tank, means adapted to whirl said water about a curved axis as it enters the tank, said tank being formed to provide a discharge port above said whirling means and being closed to admit of air being compressed therein, and a valve coacting with said port to close the same and adapted to move upwardly away therefrom.

88. In apparatus of the class described, in combination, a tank, a source of water supply, means leading from said source of supply to said tank, and means adapted to whirl said water as it enters the tank.

89. In apparatus of the class described, in combination, a tank, a source of water supply, means adapted to lead water from said source of supply to said tank, said tank being formed to provide a channel in the lower portion thereof into which the water is led, and a deflecting plate over a portion of said channel and formed to provide a closed tapering pocket at one side of the entering stream and guide the same in the opposite direction.

90. In apparatus of the class described, in combination, a valve, a valve seat, a piston adapted to force said valve from its seat, a cylinder within which said piston is mounted, and upwardly extending means upon a head of said cylinder adapted to limit the movement of said piston.

91. In apparatus of the class described, in combination, a valve, a valve seat, a piston adapted to force said valve from its seat, a cylinder within which said piston is mounted, and upwardly extending means upon a head of said cylinder adapted to limit the movement of said piston, said head being detachably secured to said cylinder.

In testimony whereof I affix my signature, in the presence of two witnesses.

JOHN A. STAPLES.

Witnesses:
 JOHN H. JACKSON,
 FRED NEAL.